(12) United States Patent
Pascale et al.

(10) Patent No.: US 12,491,072 B2
(45) Date of Patent: Dec. 9, 2025

(54) INTERCALARY ENDOPROSTHESIS

(71) Applicant: Howmedica Osteonics Corp., Mahwah, NJ (US)

(72) Inventors: Kenneth Pascale, Hoboken, NJ (US); Don Imami, Hoboken, NJ (US); Guillermo Mendoza, Jersey City, NJ (US)

(73) Assignee: Howmedica Osteonics Corp., Mahwah, NJ (US)

( * ) Notice: Subject to any disclaimer, the term of this patent is extended or adjusted under 35 U.S.C. 154(b) by 199 days.

(21) Appl. No.: 17/336,571

(22) Filed: Jun. 2, 2021

(65) Prior Publication Data

US 2021/0378827 A1    Dec. 9, 2021

Related U.S. Application Data

(60) Provisional application No. 63/034,147, filed on Jun. 3, 2020.

(51) Int. Cl.
*A61F 2/30* (2006.01)
*A61B 17/00* (2006.01)
(Continued)

(52) U.S. Cl.
CPC .............. *A61F 2/28* (2013.01); *A61B 17/72* (2013.01); *A61F 2002/2825* (2013.01); *A61F 2002/30787* (2013.01)

(58) Field of Classification Search
None
See application file for complete search history.

(56) References Cited

U.S. PATENT DOCUMENTS 3,818,513 A    6/1974    Pillet
3,990,116 A    11/1976   Fixel et al.
(Continued)

FOREIGN PATENT DOCUMENTS

DE    3528728 A1 *    2/1987
EP    0551611 A1      7/1993
(Continued)

OTHER PUBLICATIONS

MEGASYSTEM-C® Modular Bone and Joint Revision System brochure by Waldemar Link GmbH & Co. KG, Hamburg, Germany, Apr. 2017; 60 pages.
(Continued)

*Primary Examiner* — Ann Hu
(74) *Attorney, Agent, or Firm* — Lerner David LLP

(57) ABSTRACT

An intercalary prosthesis for spanning portions of a long bone includes a first intramedullary component that has a first stem and a first connector disposed at one end of the first stem. The first stem is configured to be received within an intramedullary canal of a long bone. A second intramedullary component has a second stem and a second connector disposed at one end of the second stem. The second stem is configured to be received within an intramedullary canal of the long bone. The prosthesis also includes a connector component. The connector component has a body that includes opposing ends each with a connector configured to respectively connect to the connectors of the first and second intramedullary components. The body also has an outer shell and an inner lattice structure disposed within and connected to the outer shell.

18 Claims, 7 Drawing Sheets

(51) Int. Cl.
*A61B 17/72* (2006.01)
*A61B 17/84* (2006.01)
*A61B 17/86* (2006.01)
*A61F 2/28* (2006.01)
*A61F 2/38* (2006.01)

(56) References Cited

U.S. PATENT DOCUMENTS

| | | | | |
|---|---|---|---|---|
| 4,016,874 A * | 4/1977 | Maffei | ............ | A61B 17/72 606/62 |
| 4,467,794 A * | 8/1984 | Maffei | ............ | A61B 17/72 606/62 |
| 4,657,550 A * | 4/1987 | Daher | ............ | A61F 2/44 623/17.11 |
| 4,787,907 A * | 11/1988 | Carignan | ............ | A61F 2/28 623/23.44 |
| 4,938,768 A | 7/1990 | Wu | | |
| 5,211,664 A * | 5/1993 | Tepic | ............ | A61L 31/146 623/16.11 |
| 5,281,226 A | 1/1994 | Davydov et al. | | |
| 5,334,184 A * | 8/1994 | Bimman | ............ | A61B 17/7258 606/63 |
| 5,352,227 A * | 10/1994 | O'Hara | ............ | A61F 2/4637 606/68 |
| 5,499,985 A | 3/1996 | Hein | | |
| 5,626,580 A | 5/1997 | Brosnahan | | |
| 6,454,810 B1 * | 9/2002 | Lob | ............ | A61F 2/28 606/62 |
| 6,613,092 B1 * | 9/2003 | Kana | ............ | A61F 2/30942 623/23.45 |
| 6,719,793 B2 * | 4/2004 | McGee | ............ | A61F 2/28 623/16.11 |
| 7,001,386 B2 * | 2/2006 | Sohngen | ............ | A61B 17/7241 606/62 |
| 7,125,423 B2 * | 10/2006 | Hazebrouck | ............ | A61F 2/30721 606/62 |
| 7,131,995 B2 * | 11/2006 | Biedermann | ............ | B21D 41/02 623/23.46 |
| 7,141,067 B2 * | 11/2006 | Jones | ............ | A61F 2/28 606/62 |
| 7,141,073 B2 * | 11/2006 | May | ............ | A61B 17/1725 623/32 |
| 7,153,326 B1 * | 12/2006 | Metzger | ............ | A61F 2/389 623/20.14 |
| 7,182,786 B2 | 2/2007 | Justin et al. | | |
| 7,435,263 B2 * | 10/2008 | Barnett | ............ | A61F 2/3804 623/19.12 |
| 7,507,256 B2 * | 3/2009 | Heck | ............ | A61F 2/384 623/20.15 |
| 7,675,462 B2 * | 3/2010 | Gerlinger | ............ | H04B 7/18513 342/359 |
| 7,867,282 B2 | 1/2011 | Heck et al. | | |
| 7,909,883 B2 * | 3/2011 | Sidebotham | ............ | A61F 2/2814 623/32 |
| 7,998,218 B1 * | 8/2011 | Brown | ............ | A61F 2/385 623/20.14 |
| 8,100,982 B2 | 1/2012 | Heck et al. | | |
| 8,518,122 B2 * | 8/2013 | Anapliotis | ............ | A61F 2/30 623/22.42 |
| 8,840,614 B2 * | 9/2014 | Mikhail | ............ | A61F 2/4644 606/86 R |
| 8,968,415 B2 * | 3/2015 | Meridew | ............ | A61F 2/3601 623/22.4 |
| 9,060,823 B2 | 6/2015 | Rose et al. | | |
| 9,597,203 B2 * | 3/2017 | Emerick | ............ | A61F 2/40 |
| 10,507,110 B2 * | 12/2019 | Larsen | ............ | A61F 2/30907 |
| 10,610,368 B2 * | 4/2020 | Ehmke | ............ | A61F 2/4606 |
| 10,980,580 B2 * | 4/2021 | Roberts | ............ | A61F 2/38 |
| 11,234,746 B2 * | 2/2022 | Peterson | ............ | A61B 17/7225 |
| 2003/0204267 A1 | 10/2003 | Hazebrouck et al. | | |
| 2004/0133204 A1 | 7/2004 | Davies | | |
| 2004/0193267 A1 * | 9/2004 | Jones | ............ | A61F 2/28 623/16.11 |
| 2004/0193268 A1 * | 9/2004 | Hazebrouck | ............ | A61F 2/30721 623/16.11 |
| 2005/0107794 A1 * | 5/2005 | Hazebrouck | ............ | A61F 2/30721 606/62 |
| 2006/0167560 A1 * | 7/2006 | Heck | ............ | A61F 2/384 623/20.15 |
| 2007/0203584 A1 * | 8/2007 | Bandyopadhyay | ............ | B23K 26/0006 623/901 |
| 2009/0182336 A1 * | 7/2009 | Brenzel | ............ | A61B 17/869 606/62 |
| 2011/0087227 A1 * | 4/2011 | Mazur | ............ | A61B 17/7266 606/62 |
| 2011/0112649 A1 | 5/2011 | Isch et al. | | |
| 2011/0208315 A1 | 8/2011 | Anapliotis et al. | | |
| 2014/0039499 A1 | 2/2014 | Rose et al. | | |
| 2016/0346018 A1 | 12/2016 | Gregory et al. | | |
| 2019/0209327 A1 | 7/2019 | Fitzpatrick et al. | | |

FOREIGN PATENT DOCUMENTS

| | | | | |
|---|---|---|---|---|
| EP | 0729732 A2 | 9/1996 | | |
| EP | 2289469 A2 * | 3/2011 | ............ | A61F 2/4465 |
| GB | 2555907 A | 5/2018 | | |
| WO | WO-2014022506 A1 * | 2/2014 | ............ | A61F 2/4059 |

OTHER PUBLICATIONS

Zimmer Segmental System; Distal Femoral Surgical Technique brochure © by Zimmer, Inc. Rev. 2, Mar. 17, 2014; 36 pages.

GMRS™ Distal Femoral Surgical Protocol brochure © by Stryker Orthopaedics, Mahwah, NJ; 2004; 52 pages.

* cited by examiner

INTERCALARY ENDOPROSTHESIS

CROSS-REFERENCE TO RELATED APPLICATIONS

This application claims the benefit of the filing date of U.S. Provisional Patent Application No. 63/034,147, filed Jun. 3, 2020, the disclosure of which is hereby incorporated by reference.

BACKGROUND

Intercalary skeletal defects may result from trauma or resection of diaphyseal bone tumors in long bones, such as a femur, tibia, and the like. In this regard, a segment of damaged or diseased bone between two joints may be completely removed so that the long bone is no longer one continuous bone extending from joint to joint, but is instead divided into two healthy bone segments. Since it is desirable to keep as much healthy bone as possible, particularly at the joints, it is necessary to join the healthy bone segments together through a reconstruction process. However, this presents reconstructive challenges for orthopedic surgeons as they have to ensure a stable structure, which may be load bearing, while also accounting for the missing bone, the length of which varies from patient to patient.

Various reconstruction implants have been developed over the years to salvage the healthy bone. However, such implants are typically not patient specific and therefore may leave the patient with awkward bone geometries and a longer or shorter limb than prior to their disease or injury. Additionally, such implants are often heavy as compared to bone and may be difficult to implant and assemble in-situ as the healthy bone segments can be distracted only so far. Thus, further improvements are desirable.

BRIEF SUMMARY OF THE INVENTION

In one aspect of the present disclosure, an intercalary prosthesis for spanning portions of a long bone include an intramedullary component that has a first stem and a first connector disposed at one end of the first stem. The first stem is configured to be received within an intramedullary canal of a long bone. The prosthesis also includes a second intramedullary component that has second stem and a second connector disposed at one end of the second stem. The second stem is configured to be received within an intramedullary canal of the long bone. The prosthesis further includes a connector component that has a body. The body has opposing ends each with a connector configured to respectively connect to the connectors of the first and second intramedullary components. The body has an outer shell and an inner lattice structure disposed within and connected to the outer shell.

Additionally, the first and second intramedullary components may each include a modular collar and an integral collar. The modular collar may be connectable to the integral collar and may have an outer surface that comprises a porous structure. The integral collar of the first intramedullary component may be disposed between the first stem and first connector portion. The body of the connector component may also include a plurality of openings extending through the outer shell to the inner lattice structure. The lattice structure may be comprised of a plurality of interconnected struts forming interstices therebetween. The connector component may further include a plurality of flats circumferentially arrayed about a longitudinal axis of the connector for engagement by a torque applying tool.

Continuing with this aspect, the body may be bowed such that a longitudinal axis thereof is curved about a center of curvature. The body may include an anterior groove that is coplanar with the center of curvature. The first and second connectors may each be a female connector, and the connectors of the connector component may be male connectors extending from opposing ends of the body. The male connectors may be configured to be respectively received within the female connectors and locked thereto upon rotation of the connector component relative to the first and second intramedullary components. The first and second connectors may each be a male connector respectively extending from the first and second stems. The connectors of the connector component may be female connectors disposed at opposing ends of the body. The male connectors may be configured to be respectively received within the female connectors and locked thereto upon rotation of the connector component relative to the first and second intramedullary components.

In another aspect of the present disclosure, an intercalary prosthesis for spanning portions of a long bone includes a first intramedullary component that has a first stem and a first connector disposed at one end of the first stem. The first stem is configured to be received within an intramedullary canal of a long bone. The prosthesis also includes a second intramedullary component that has a second stem and a second connector disposed at one end of the second stem. The second stem is configured to be received within an intramedullary canal of the long bone. The prosthesis further includes a connector component that has a body and third and fourth connectors disposed at opposed ends of the body. The first and third connectors and second and fourth connectors are configured to be locked to each other upon rotation of the connector component relative to the first and second intramedullary components.

Additionally, the first and second connectors may each be a female connector, and the third and fourth connectors of the connector component may be male connectors extending from opposing ends of the body. The male connectors may be configured to be respectively received within the female connectors and locked thereto upon rotation of the connector component relative to the first and second intramedullary components. The male connectors may include a post and spline keys extending from the post, and the female connectors may include a spiraled recess configured to interfere with the spline keys when rotated within the spiraled recess for providing a locking connection. Alternatively, the male connectors may include a cam surface and a tooth, and the female connectors may include a recess with a leaf spring extending therein. The cam surface may be configured to move the leaf spring radially outwardly upon rotation of the male connectors in a first direction. The tooth may be configured to engage the leaf spring to prevent rotation of the male connectors in a second direction.

Continuing with this aspect, the first and second connectors may each be a male connector respectively extending from the first and second stem, and the third and fourth connectors of the connector component may be female connectors disposed at opposing ends of the body. The male connectors may be configured to be respectively received within the female connectors and locked thereto upon rotation of the connector component relative to the first and second intramedullary components. The male connectors may include a post and spline keys extending from the post, and the female connectors may include a spiraled recess configured to interfere with the spline keys when rotated within the spiraled recess. Alternatively, the male connectors may include cam surface and a tooth, and the female connectors may include a recess with a leaf spring extending therein. The cam surface may be configured to move the leaf spring radially outwardly upon rotation of the male connectors in a first direction. The tooth may be configured to engage the leaf spring to prevent rotation of the male connectors in a second direction. The body of the connector component may include a solid shell surrounding a lattice structure.

In a further aspect of the present disclosure, a method of connecting first and second portions of a long bone includes: inserting a first stem of a first intramedullary component into a first portion of a long bone and a second stem of a second intramedullary component into a second portion of the long bone. After the inserting step, the method includes connecting a first end of a connector component to an end of the first intramedullary component and a second end of the connector component to an end of the second intramedullary component.

Additionally, the connecting step may include rotating the connector to lock the first and second intramedullary components to the connector component. The connecting step may also include inserting male connectors each extending from opposing ends of a body of the connector component into respective female connectors of the first and second intramedullary components. Alternatively, the connecting step may include inserting male connectors each extending from a respective end of the first and second intramedullary components into respective female connectors of the connector component. The female connectors may be disposed at opposing ends of a body of the connector component.

BRIEF DESCRIPTION OF THE DRAWINGS

The features, aspects, and advantages of the present invention will become better understood with regard to the following description, appended claims, and accompanying drawings in which:

DETAILED DESCRIPTION

Figure 1A:
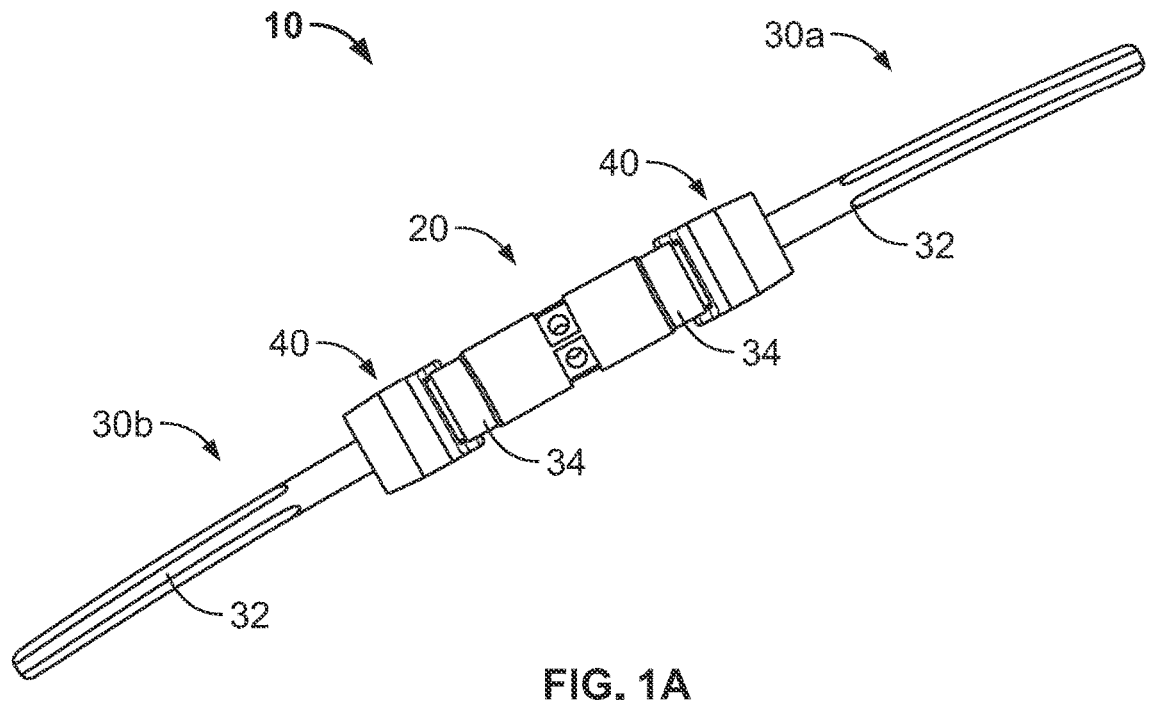
FIG. 1A is a perspective view of an intercalary prosthesis according to an embodiment of the present disclosure.

When referring to specific directions in the following discussion of certain implantable devices, it should be understood that such directions are described with regard to the implantable device's orientation and position during exemplary application to the human body. Thus, as used herein, the term "proximal" means close to the heart and the term "distal" means more distant from the heart. The term "inferior" means toward the feet and the term "superior" means toward the head. The term "anterior" means toward the front of the body or the face, and the term "posterior" means toward the back of the body. The term "medial" means toward the midline of the body, and the term "lateral" means away from the midline of the body. Also, as used herein, the terms "about," "generally" and "substantially" are intended to mean that slight deviations from absolute are included within the scope of the term so modified.

FIGS. 1A-4B depict an intercalary prosthesis 10 according to an embodiment of the present disclosure. The intercalary prosthesis 10 generally includes a first intramedullary component 30a, a second intramedullary component 30b, and a connector component 20.

The connector component 20 generally includes a body 21 and connectors disposed 22 at opposing ends of the body 21. The body 21 has an outer shell 29 and an inner lattice structure 50. The outer shell 29 is a solid metal material with a generally continuous outer surface. The outer shell 29 defines a hollow cavity 27 therein which is occupied by the lattice structure 50. The lattice structure 50 is connected to the outer shell 29 and provides structural support to the connector component 20 while also providing reduced weight as compared to a connector component that is completely solid through its entire thickness. The lattice structure 50 is formed of a plurality of interconnected struts 52 which defined interstices 54 therebetween.

The body 21 includes a plurality of openings 25 extending through the outer shell and into the inner cavity 27 so as to communicate with the lattice structure 50. This facilitates the removal of metallic powder from the cavity 27 after manufacturing via an additive manufacturing process, as described below. The body 21 also includes a plurality of flats 28 circumferentially arrayed about a longitudinal axis thereof. These flats 28 are angled relative to each other so that they can be engaged by a torque applying tool, such as a wrench, to facilitate the rotation of the connector component in-situ. In the particular embodiment depicted, the openings 25 in the body 21 each extend through a corresponding flat 28. However, in other embodiments, the openings 25 may extend through other regions of the body 21.

Figure 2A:
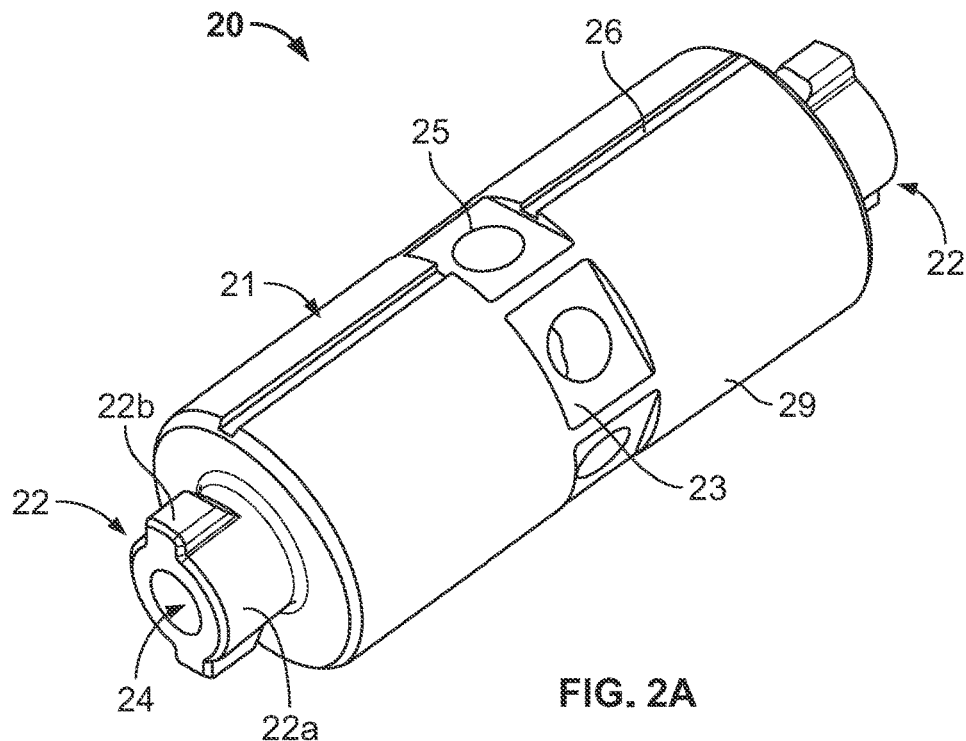
FIG. 2A is a perspective view of a connector component of the prosthesis of FIG. 1A.

In addition, the body 21 may have a patient specific curvature or bow. For example, femurs typically have an anterior curvature or bow. The body 21 may be manufactured such that it matches the curvature or bow of the patient's particular anatomy. In this regard, connector component 20 may have a longitudinal axis that is curved about a center of curvature which would be positioned posterior to the body 21. An anterior groove 21a, as shown in FIG. 2A, may be aligned with this curvature so as to provide the surgeon the appropriate orientation. In this regard, the anterior groove 26 may have an axis that is coplanar with the center of curvature.

Figure 2B:
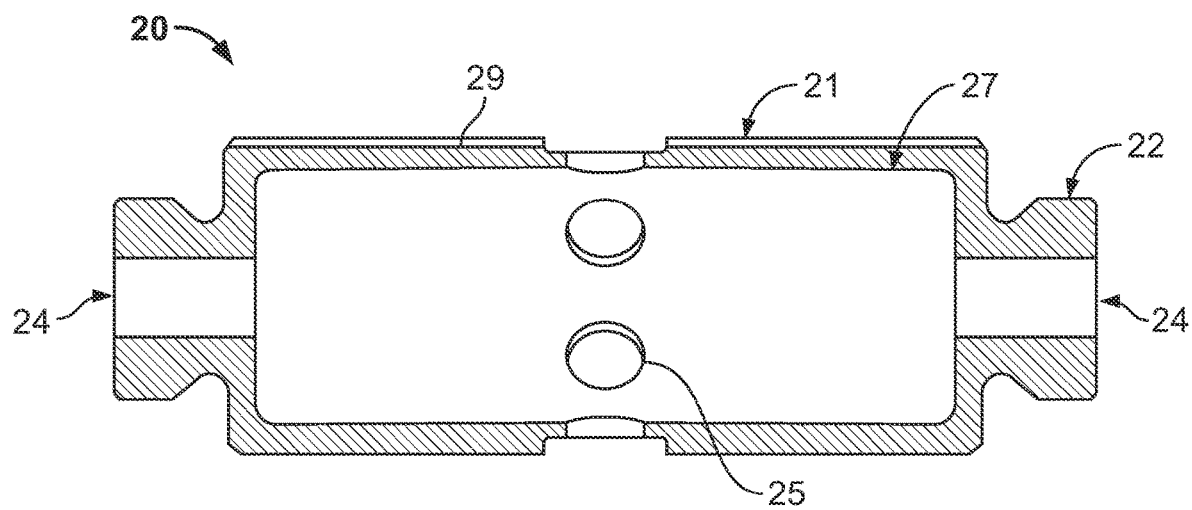
FIG. 2B is a cross-sectional view of the connector component of FIG. 2A taken along a midline thereof and absent a lattice structure.
Figure 2C:
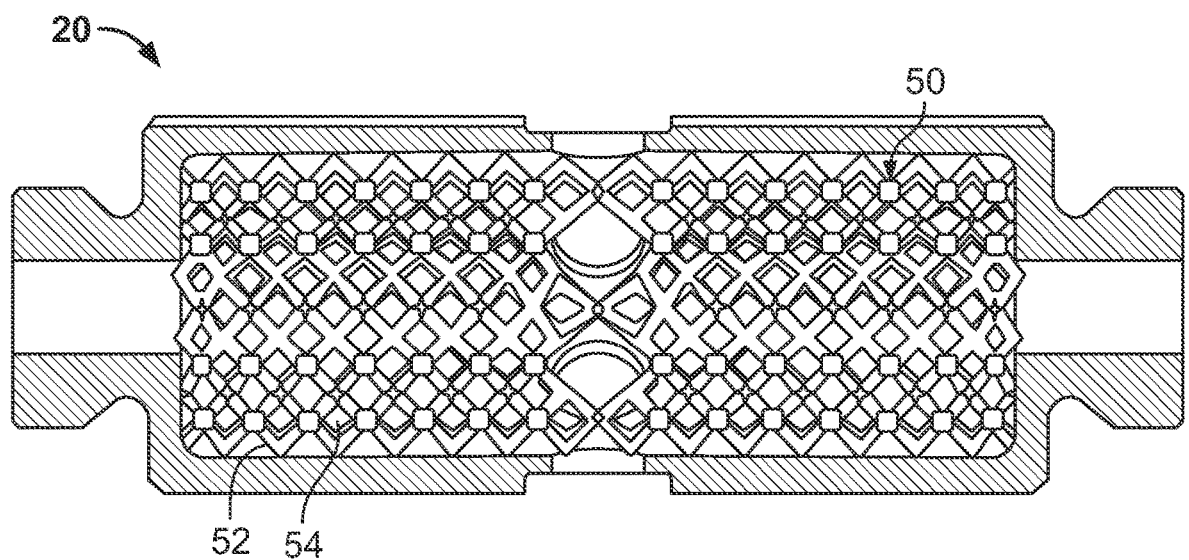
FIG. 2c is a cross-sectional view of the connector component of FIG. 2A taken along a midline thereof and including a lattice structure.
Figure 3A:
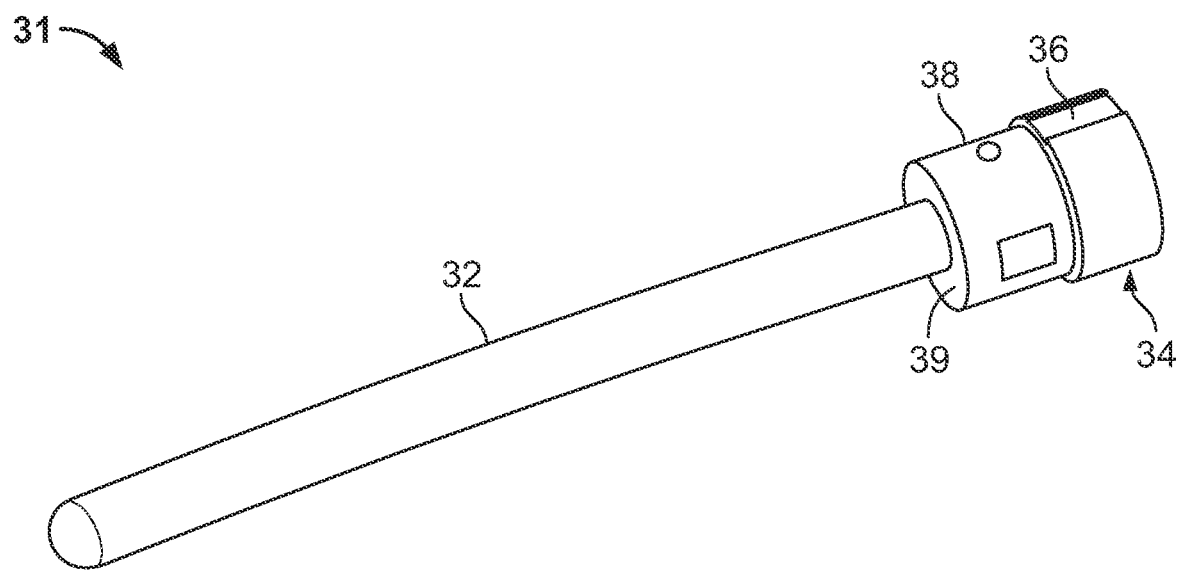
FIG. 3A is a perspective view of a stem component of the prosthesis of FIG. 1A.
Figure 3B:
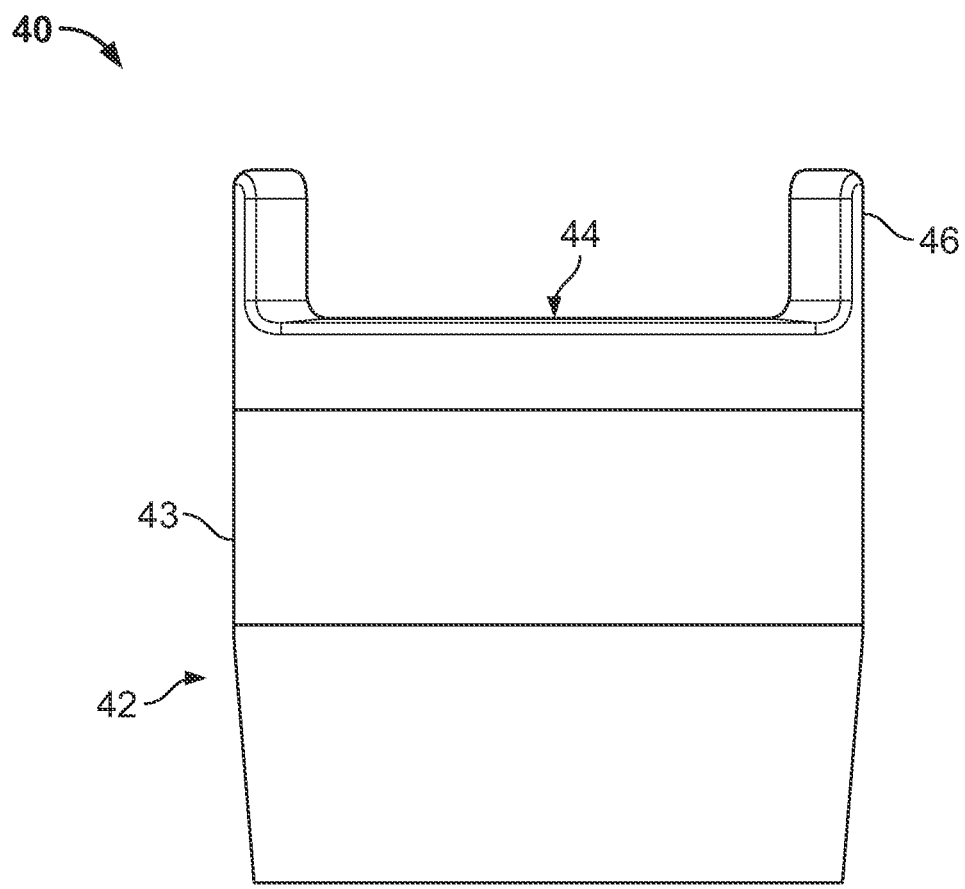
FIG. 3B is front elevational view of modular collar of the prosthesis of FIG. 1A.

As shown, the connectors 22 extend from opposing ends of the body 21 and are male connectors. More particularly, these male connectors 22 are comprised of a post 22a and one or more spline keys 22b extending radially outwardly from the post 22a. As best shown in FIGS. 2B and 2C, a through-opening 24 extends through the entire length of connector component 20 and through the center of each of the connectors 22. Such through-opening 24 communicates with the lattice structure 50 and provides an additional egress route for powder removal.

The connector component 20 is formed layer-by-layer using additive layer manufacturing (ALM), i.e., 3D printing, process so no separate connection mechanism is necessary to bring together any of the multiple features of the implant, such as the connectors, shell and lattice structure. In some examples, ALM processes are powder-bed based and involve one or more of selective laser sintering (SLS), selective laser melting (SLM), and electron beam melting (EBM), as disclosed in U.S. Pat. Nos. 7,537,664; 8,728,387; 9,180,010; and 9,456,901, the disclosures of which are hereby incorporated by reference in their entireties herein.

The ALM process used to form the connector component 20 allows the creation of the lattice structure 50 which is completely surrounded by the outer shell 29. This allows the connector component 20 to be lighter weight than a connector component made from traditional manufacturing processes, such as machining, forging and casting, without sacrificing strength. The openings 25 in the body 21 and through-opening 24 facilitate the removal of loose powder from within the lattice structure after the connector component has been made. In addition, the use of ALM allows for a custom or semi-custom design. In preparing such an implant, the patient's anatomy around at least the region for treatment may be scanned, such as by a CT scan or other use of x-rays or by magnetic resonance imaging (MRI) or other known imaging device. The scanned image may then be converted to virtual patient-specific bone image using computer-aided modeling and segmentation software. Such software may be but is not limited to Imorphics™, which is wholly owned by Imorphics Limited, a subsidiary of Stryker® Corporation, Stryker® Orthopaedics Modeling and Analytics (SOMA) by Stryker® Corporation, GeoMagic® by 3D Systems, Inc., and 3D Slicer software developed by the Massachusetts Institute of Technology. A manual segmentation or an automatic segmentation process, such as either of the processes described in U.S. Pat. No. 7,584,080 and U.S. Patent Application Publication No. 2011/0194739 A1, which are hereby incorporated by reference in their entireties herein, may be used. A virtual connector component 20 would then be manipulated in the virtual space to match certain aspects of the patient's anatomy, such as an anterior curvature of the patient's femur, also known as an anterior bow, which is discussed above. The virtual component 20 could then be printed with those same features using ALM.

The first and second stem assemblies 30a-b each generally include a stem component 32 and a modular collar 40. The stem component 31 includes an intramedullary stem 32, integral collar 38, and a connector 34. The stem 32 may have flutes (not shown) for anti-rotation or indented elongate grooves for strength. The integral collar 38 is positioned between the stem 32 and connector 34. The integral collar 38 has a larger cross-sectional dimension than the stem 32 and may have a tapered outer surface. For embodiments in which collar 38 is a separate component that couples with stem 32, collar 38 may have a tapered inner diameter to facilitate a taper-lock connection to the stem 32.

Figure 4A:
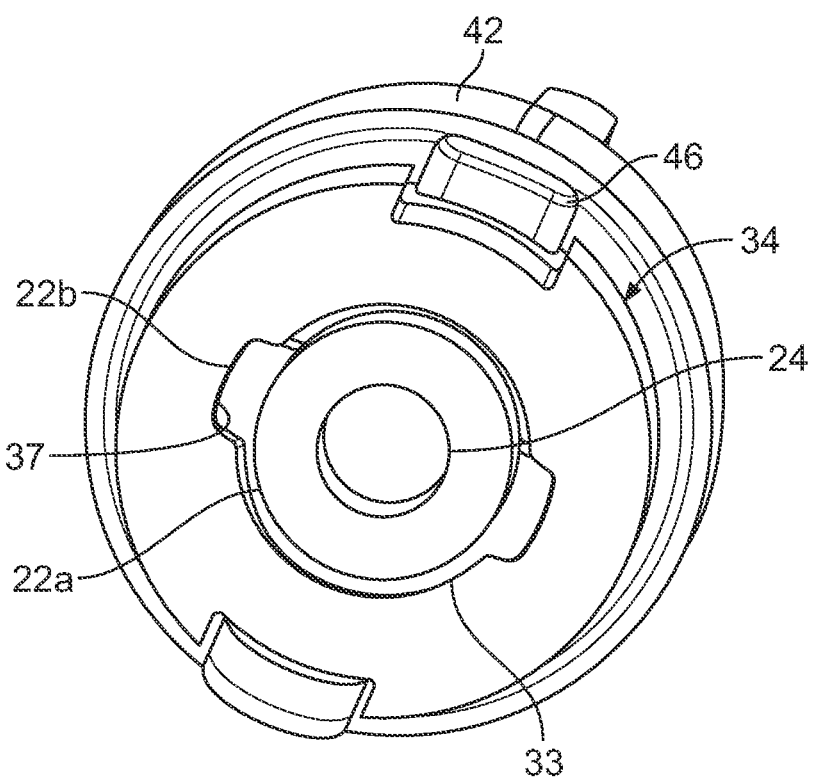
FIG. 4A is a cross-sectional view of the connector component and stem component of FIGS. 2A and 3A while being assembled.
Figure 4B:
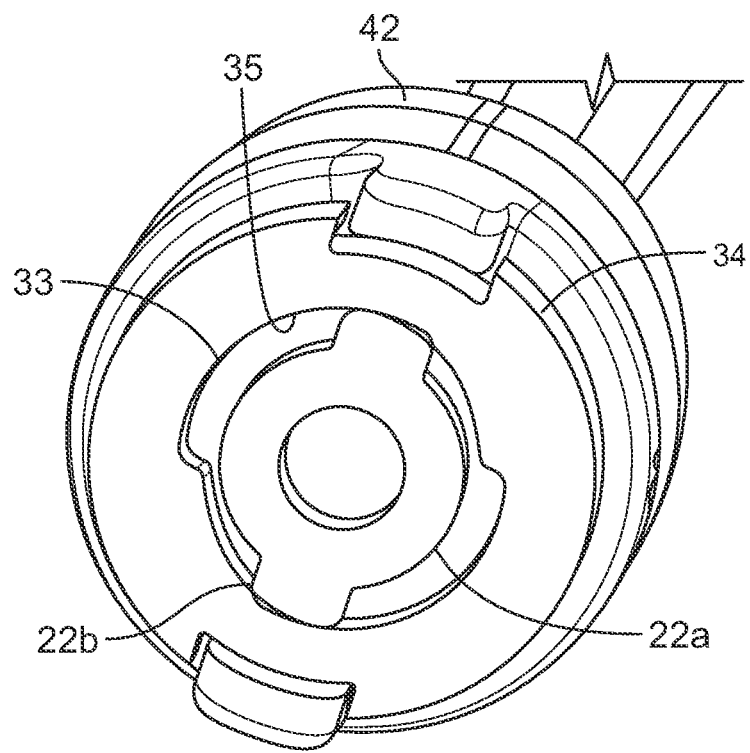
FIG. 4B is a cross-sectional view of the connector component and stem component of FIGS. 2A and 3A as assembled.

The connector 20 may have a larger cross-sectional dimension than the integral collar 38 so as to form a shoulder 39 which acts as a stop for the modular collar 40. The connector 34 also has a plurality of notches 36 on its exterior for receipt of the tabs 46 of the modular collar, as discussed below. The connector 34, as best shown in FIGS. 4A and 4B, is a female connector. As a female connector, it has an opening 33 for receipt of the male connector 22 of the connector component 20. Such opening 33 has notches 37 configured to receive the splines 22b of the male connector 22 in one orientation, as best shown in FIG. 4A. Within opening 33 is a spiraled groove 35 which has one or more surfaces, depending on the number of splines 22b, which each have a progressively smaller radius so as to interfere with a corresponding spline 22b in order lock the male and female connectors 20, 34 together, as best shown in FIG. 4B.

The modular collar 40 has a body 42 with a porous outer surface 43 and an opening extending 44 entirely through the body 42 along a length of the modular collar 40. The through-opening 44 may be tapered so as to facilitate a taper lock between the integral collar 38 and modular collar 40. Tabs 46 extend from one end of the body 42 and may be received within the notches 36 in the connector 34 so as to prohibit rotation of the modular collar 40 relative to the stem component 31.

Figure 1B:
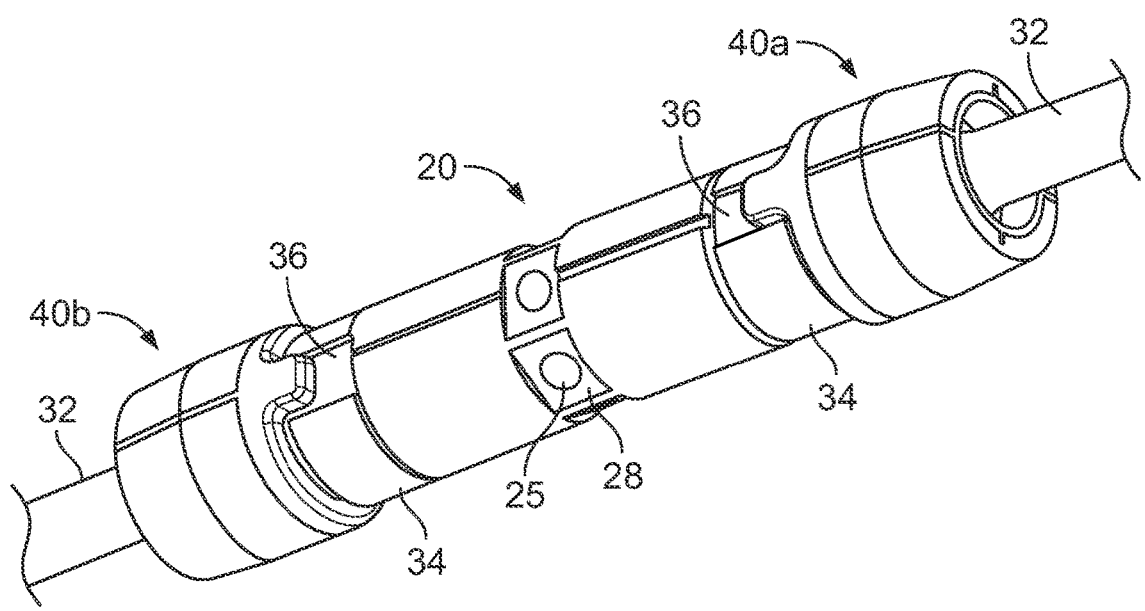
FIG. 1B is a partial perspective view of the prosthesis of FIG. 1A.

As assembled, the connector component 20 is positioned between the first and second intramedullary components 30a, 30b and locked thereto via the corresponding connectors 22, 34, as shown in FIGS. 1A and 1B. The modular collars 40 are positioned over the respective integral collars 38 of the stem components 30a, 30b.

In a method of implantation, the connector component 20 facilitates the assembly of the endoprosthesis in-situ. In this regard, the first and second intramedullary components 30a-b are implanted into respective bone portions. For example, a femur may include a first or proximal bone portion and a second or distal bone portion. The stem 32 of the first intramedullary component 30a may be inserted into the intramedullary canal of the first bone portion, such as in a press-fit or cemented manner. Similarly, the stem 32 of the second intramedullary component 30b may be inserted into the intramedullary canal of the second bone portion, also in a press-fit or cemented manner. The first and second intramedullary components 30a-b may be implanted such that the modular collars 40, which are assembled to the stem components 30a-b prior to implantation, abut the ends of the respective bone portions. The bone may grow into the porous structures 42 of the modular collars 40.

Once the intramedullary components 30a-b are implanted, the connector component 20 is positioned between the intramedullary components 30a-b. The connectors 22 of the connector component 20 are then inserted into the connectors 34 of the respective intramedullary components 30a-b, as best shown in FIG. 4A. In this regard, splines 22b pass through notches 37. Once splines 22b are inserted passed notches 37, the connector component 20 may be rotated such as via a wrench or the like which causes the splines 22b to engage the spiral grooves 35 thereby locking the connector component 20 to the intramedullary components 30a-b, as best shown in FIG. 4B. It is noted that the connector component 20 and intramedullary components 30a-b are oriented prior to rotation in a way that once the connector component 20 is rotated into the locked position, the anterior groove 26 faces anterior so that the bow of the connector component 20 aligns with the bow of the patient's femur.

Figure 5A:
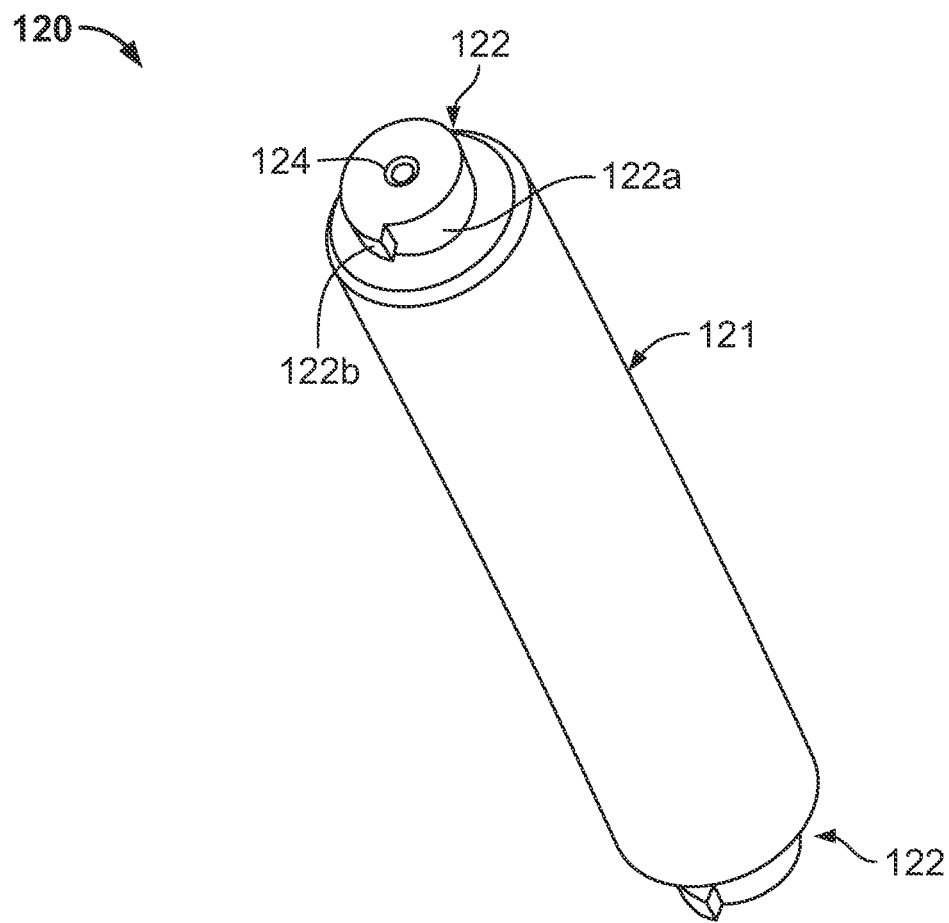
FIG. 5A is a perspective view of a connector component according to another embodiment of the present disclosure.
Figure 5B:
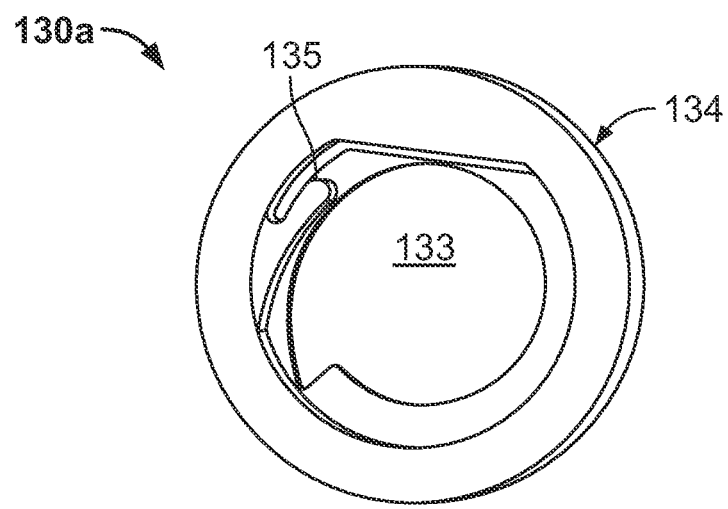
FIG. 5B is a cross-sectional view of a stem component according to another embodiment of the present disclosure.
Figure 5C:
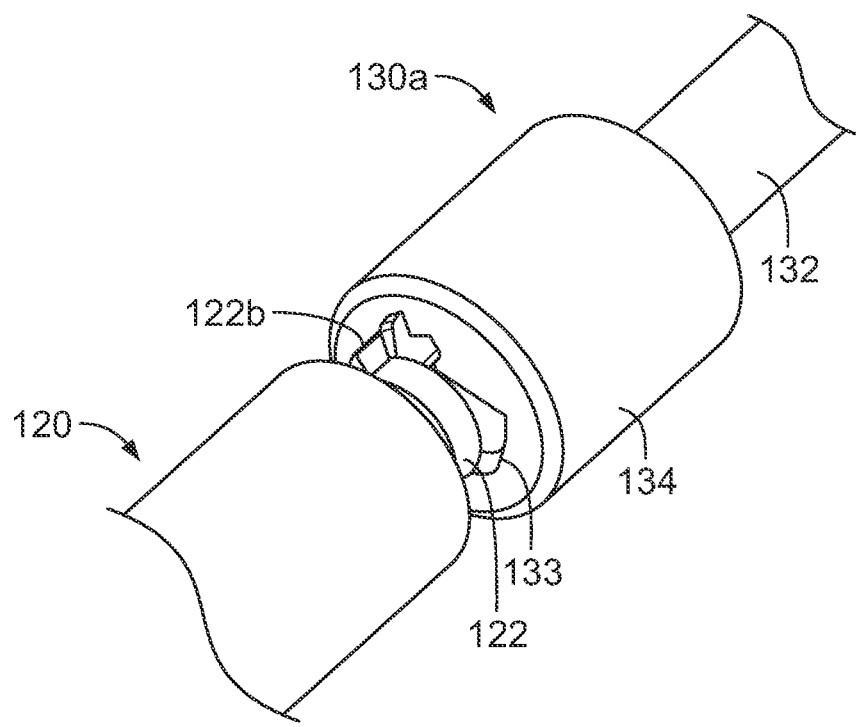
FIG. 5C is an exploded view of the connector component and stem component of FIGS. 5A and 5B.
Figure 5D:
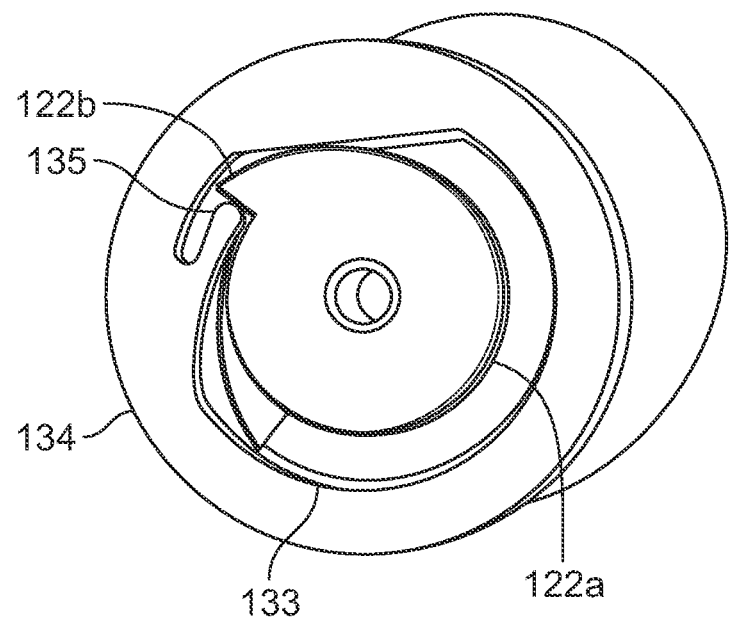
FIG. 5D is a cross-sectional view of the connector component and stem component of FIGS. 5A and 5B as assembled.

FIGS. 5A-5C depict a connector component 120 and intramedullary component 130*a* according to another embodiment of the disclosure. Like elements are accorded like reference numerals to that of connector component 20 and intramedullary components 130*a*-*b* but within the 100 series of numbers. In this configuration, the connector component 120 and first and second intramedullary components 130*a*-*b* respectively include male and female connectors 122, 134 at their ends. FIGS. 5A-5C only depicts the first intramedullary components 130*a* which is representative of the second intramedullary component 130*b* (not shown). The male connectors 122 at the ends of the connector component 120 is in the form of a snail cam defined by a spiral post 122*a* that has a reducing radius cam surface that terminates at a tooth 122*b*. The female connectors 134 at the ends of the intramedullary components 130*a*-*b* have a grooved opening 133 with a leaf spring 135 that extends into the opening 133, as shown in FIG. 5B.

In use, the connectors 122 of the connector component 120 are inserted into corresponding female connectors 134 of the intramedullary components 130*a*-*b,* as illustrated in FIG. 5C. Once the male connectors 122 are received within the corresponding female connectors 134, the connector component 120 is rotated about its axis in the same manner described above. This causes the cam surfaces to push the leaf spring 135 radially outwardly. Once the tooth 122*b* passes the leaf spring 135, the leaf spring 135 snaps back into its original position. The tooth 122*b* now extends further radially outwardly than the leaf spring 135 which prohibits rotation of the connector component 120 in the opposite direction thereby locking the connector component 120 to the intramedullary components 130*a*-*b.*

Other connector configurations are also contemplated but not shown. For example, the male connector of connector component 20 may instead be located at the ends of intramedullary components 30*a*-*b,* while the female connectors of components 30*a*-*b* may be located at the ends of connector component 20. In other words, the connection is functionally the same as that of components 20 and 30*a*-*b* but with the male/female connectors 22, 34 being swapped between components 20 and 30*a*-*b*. Such reverse configuration of male/female connectors is also contemplated for connector component 120 and intramedullary components 130*a*-*b.*

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An intercalary prosthesis for spanning portions of a long bone, comprising:
   a first intramedullary component having a first stem and a first connector disposed at one end of the first stem, the first stem being configured to be received within an intramedullary canal of a long bone;
   a second intramedullary component having a second stem and a second connector disposed at one end of the second stem, the second stem being configured to be received within the intramedullary canal of the long bone at the same time as the first stem; and
   a monolithic connector component having a body, the body having opposing ends each having a connector configured to respectively connect to the connectors of the first and second intramedullary components, the body also having an outer shell and an inner lattice structure disposed within and connected to the outer shell.

2. The prosthesis of claim 1, wherein the first and second intramedullary components each include a modular collar and an integral collar, the modular collar being connectable to the integral collar and having an outer surface comprising a porous structure.

3. The prosthesis of claim 2, wherein the integral collar of the first intramedullary component is disposed between the first stem and first connector portion.

4. The prosthesis of claim 1, wherein the body of the connector component includes a plurality of openings extending through the outer shell to the inner lattice structure.

5. The prosthesis of claim 1, wherein the lattice structure is comprised of a plurality of interconnected struts forming interstices therebetween.

6. The prosthesis of claim 1, wherein the body of the connector component includes a plurality of flats circumferentially arrayed about a longitudinal axis of the connector for engagement by a torque applying tool.

7. The prosthesis of claim 1, wherein the body is bowed such that a longitudinal axis thereof is curved about a center of curvature.

8. The prosthesis of claim 7, wherein the body includes an anterior groove that is coplanar with the center of curvature.

9. The prosthesis of claim 1, wherein the first and second connectors are each a female connector, and the connectors of the connector component are male connectors extending from opposing ends of the body, the male connectors being configured to be respectively received within the female connectors and locked thereto upon rotation of the connector component relative to the first and second intramedullary components.

10. The prosthesis of claim 1, wherein the first and second connectors are each a male connector respectively extending from the first and second stems, and the connectors of the connector component are female connectors disposed at opposing ends of the body, the male connectors being configured to be respectively received within the female connectors and locked thereto upon rotation of the connector component relative to the first and second intramedullary components.

11. An intercalary prosthesis for spanning portions of a long bone, comprising:
    a first intramedullary component having a first stem and a first connector disposed at one end of the first stem, the first stem being configured to be received within an intramedullary canal of a long bone;
    a second intramedullary component having a second stem and a second connector disposed at one end of the second stem, the second stem being configured to be received within the intramedullary canal of the long bone at the same time as the first stem; and
    a monolithic connector component having a body and third and fourth connectors disposed at opposed ends of the body,
    wherein the first and third connectors and second and fourth connectors are configured to be locked to each other by radial interference between the connector component and the first and second connectors upon rotation of the connector component relative to the first and second, and wherein the body of the connector component includes a solid shell surrounding a lattice structure.

12. The prosthesis of claim 11, wherein the first and second connectors are each a female connector, and the third and fourth connectors of the connector component are male connectors extending from opposing ends of the body, the male connectors being configured to be respectively received within the female connectors and locked thereto upon rotation of the connector component relative to the first and second intramedullary components.

13. The prosthesis of claim 12, wherein the male connectors include a post and spline keys extending from the post, and the female connectors include a spiraled recess configured to interfere with the spline keys when rotated within the spiraled recess for providing a locking connection.

14. The prosthesis of claim 12, wherein the male connectors include cam surface and a tooth, and the female connectors include a recess with a leaf spring extending therein, the cam surface being configured to move the leaf spring radially outwardly upon rotation of the male connectors in a first direction, the tooth being configured to engage the leaf spring to prevent rotation of the male connectors in a second direction.

15. The prosthesis of claim 11, wherein the first and second connectors are each a male connector respectively extending from the first and second stem, and the third and fourth connectors of the connector component are female connectors disposed at opposing ends of the body, the male connectors being configured to be respectively received within the female connectors and locked thereto upon rotation of the connector component relative to the first and second intramedullary components.

16. The prosthesis of claim 15, wherein the male connectors include a post and spline keys extending from the post, and the female connectors include a spiraled recess configured to interfere with the spline keys when rotated within the spiraled recess.

17. The prosthesis of claim 1, wherein the connector component is configured to be locked to the first and second connectors by relative rotation.

18. An intercalary prosthesis for spanning portions of a long bone, comprising:
 a first intramedullary component having a first stem and a first connector disposed at one end of the first stem, the first stem being configured to be received within an intramedullary canal of a long bone;
 a second intramedullary component having a second stem and a second connector disposed at one end of the second stem, the second stem being configured to be received within the intramedullary canal of the long bone at the same time as the first stem; and
 a monolithic connector component having a body, the body having opposing ends each having a connector configured to respectively connect to the connectors of the first and second intramedullary components, the connector component configured to be locked to the first and second connectors of the first and second intramedullary components by relative rotation, and the body also having an outer shell and an inner lattice structure disposed within and connected to the outer shell.

* * * * *